UNITED STATES PATENT OFFICE.

FRANZ SCHOLL, OF HOCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

BLACK MONO-AZO DYE AND PROCESS OF MAKING.

958,774.

Specification of Letters Patent. Patented May 24, 1910.

No Drawing. Application filed August 5, 1909. Serial No. 511,267.

*To all whom it may concern:*

Be it known that I, FRANZ SCHOLL, Ph. D., chemist, a citizen of the Empire of Germany, residing at Höchst-on-the-Main, Germany, have invented certain new and useful Improvements in the Manufacture of a Black Mono-Azo Dyestuff Dyeing on Mordants, of which the following is a specification.

The requirements in respect of the fastness of the dyestuffs used for fast wool dyeing have continually increased of late. This is particularly the case with black dyestuffs, for which a degree of fastness is demanded such as is possessed by only few dyestuffs.

Of the azo-dyestuffs only the so-called "chrome dyestuffs" enter into consideration, as their chrome lakes, produced on the fiber, are in many cases of great fastness to light, hot-pressing (shrinking) and milling; however, in very few cases do they fulfil all the claims lately made upon them.

A black dyestuff is expected to be not only sufficiently fast to light, milling and hot-pressing, but also to be fast to boiling water and to acid, that it to say, to possess the so-called fastness to potting and to acid boiling; in addition further excessive requirements are made as to the other properties of the dyestuff. It must be readily soluble, dye perfectly evenly and the baths must be completely exhausted, because a dyestuff which does not have these properties cannot be used in such an important branch of fastness dyeing as the machine dyeing, and because, in case of the bath not being entirely exhausted, it is impossible or very difficult to continue the dyeing in the same bath.

A further requirement in addition to those aforesaid is the beauty of the tint.

Hitherto no azo-dyestuff has been known which, besides fulfilling all the above mentioned requirements regarding fastness to light, hot-pressing, milling and to potting and acid boiling, also dyes a beautiful, bloomy violet-bluish black tint; which is moreover readily soluble and capable of being completely exhausted from the bath and of dyeing perfectly evenly. Now I have found that such a dyestuff, dyeing on mordants, can be produced easily by combining diazotized 4-chloro-2-aminophenol with 1.8.5-aminonaphtholsulfonic acid in a neutral, or slightly alkaline solution or a solution containing lime as an alkali.

This invention is all the more surprising because already a number of combinations of ortho-aminophenol derivaties with 1.8.5-aminonaphtholsulfonic acid are known. However none of these combinations can be used for dyeing a bluish-black having at the same time the aforesaid properties of fastness. Many of these known dyestuffs do not dye black tints at all. The remaining dyestuffs fail in respect of their properties of fastness, especially their fastness to light. This is borne out by the opinion prevalent among dyers that ortho-aminophenol-azo-dyestuffs of the peri-aminonaphtholsulfonic acids are not at all fast to light.

It is a surprising fact that the present new dyestuff is extremely fast to light.

Taking the qualities of this dyestuff in respect of fastness and dyeing power as a whole, the dyestuff surpasses all the known dyestuffs of its class in such a remarkable manner that its discovery means a considerable technical improvement and progress.

The following examples illustrate the invention:

Example I: 14.3 kilos of 4-chloro-2-aminophenol are dissolved in 24 kilos of hydrochloric acid of 30 per cent. strength and water, and then diazotized with a sufficient quantity (6,9 kilos) of sodium nitrite. The diazo-solution is mixed with a paste of 25 kilos of 1.8.5-amino-naphtholsulfonic acid in water and into this mixture caustic soda lye diluted with water is run until the mixture is neutral or there is an excess of soda, the mass being cooled at the same time by adding ice. After stirring for several hours the mass is heated, the excess of caustic soda lye, which may be present, is neutralized by means of an acid or a bicarbonate and the dyestuff salted out by adding the requisite quantity of salt. The dried dyestuff forms a dark powder having a metallic luster, readily soluble in water, pretty readily soluble in alcohol, insoluble in benzene and ligroin, dyeing perfectly evenly a beautiful bloomy violet-bluish-black tint, and fast to light, hot-pressing, milling and to potting and acid boiling.

Example II: 14,3 kilos of 4-chloro-2-aminophenol are diazotized as above described. The diazo-solution is run into a solution of 25 kilos of 1.8.5-aminonaphtholsulfonic acid in milk of lime containing 15 kilos of slaked lime. After the coupling is complete, the mass is heated, converted into its sodium salt by means of carbonate of soda, filtered and salted out. Alternatively, the milk of lime may be added to the mixture of the diazo-solution with the aminonaphtholsulfonic acid.

Having now particularly described my invention, what I claim is:—

1. The process of manufacturing a black mono-azo-dyestuff dyeing on mordants, which consists in combining the diazo-compound of the 4-chloro-2-aminophenol with 1.8.5-aminonaphtholsulfonic acid, substantially as described.

2. As a new article of manufacture, a black mono-azo-dyestuff, dyeing on mordants, of the constitution: 4-chloro-2-diazophenol—1.8.5-aminonaphtholsulfonic acid, being a dark powder of a metallic luster, readily soluble in water, pretty readily soluble in alcohol, insoluble in benzene and ligroin, dyeing perfectly evenly a beautiful bloomy violet-bluish-black tint, fast to light, hot-pressing, milling and to potting and acid boiling, substantially as described.

In testimony whereof, I affix my signature in presence of two witnesses.

FRANZ SCHOLL.

Witnesses:
 JEAN GRUND,
 CARL GRUND.